United States Patent
Tsai et al.

(10) Patent No.: US 11,505,304 B2
(45) Date of Patent: Nov. 22, 2022

(54) AIRCRAFT SPOILER ACTUATION SYSTEMS AND RELATED METHODS

(71) Applicant: The Boeing Company, Chicago, IL (US)

(72) Inventors: Kevin Tsai, Seattle, WA (US); Donald Drew Reinhart, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 16/657,626

(22) Filed: Oct. 18, 2019

(65) Prior Publication Data

US 2021/0114714 A1 Apr. 22, 2021

(51) Int. Cl.
*B64C 9/02* (2006.01)

(52) U.S. Cl.
CPC ..................... *B64C 9/02* (2013.01)

(58) Field of Classification Search
CPC .. B64C 9/02; B64C 9/18; B64C 9/323; B64C 3/58; B64C 13/28
See application file for complete search history.

(56) References Cited

U.S. PATENT DOCUMENTS

| | | | | |
|---|---|---|---|---|
| 2,620,147 A | * | 12/1952 | Cook, Jr. | B64C 9/16 244/216 |
| 6,824,099 B1 | * | 11/2004 | Jones | B64C 13/28 244/99.12 |
| 2012/0234983 A1 | * | 9/2012 | Wildman | B64C 9/14 244/215 |
| 2013/0320152 A1 | * | 12/2013 | Parker | B64C 9/02 244/90 A |
| 2018/0162517 A1 | * | 6/2018 | Brown | B64C 9/14 |
| 2018/0304995 A1 | * | 10/2018 | Harrington | B64C 13/30 |

* cited by examiner

*Primary Examiner* — Richard R. Green
*Assistant Examiner* — William L Gmoser
(74) *Attorney, Agent, or Firm* — Hanley, Flight & Zimmerman, LLC

(57) ABSTRACT

Example aircraft spoiler actuation systems and related methods are disclosed herein. An example spoiler actuation system includes a rotary actuator, a first output shaft coupled to the rotary actuator, a second output shaft coupled to the rotary actuator, the first output shaft opposite the second output shaft, a first actuator rod coupled to the spoiler at a first location, and a second actuator rod coupled to the spoiler at a second location, the second location spaced apart from the first location. The rotary actuator is operatively coupled to the first actuator rod via the first output shaft and to the second actuator rod via the second output shaft to cause the spoiler to move between one of a stowed position and a raised position or the stowed position and a drooped position.

20 Claims, 7 Drawing Sheets

AIRCRAFT SPOILER ACTUATION SYSTEMS AND RELATED METHODS

FIELD OF THE DISCLOSURE

This disclosure relates generally to aircraft spoilers and, more particularly, to aircraft spoiler actuation systems and related methods.

BACKGROUND

An aircraft such as a fixed-wing plane includes control surfaces coupled to a wing of the aircraft that are selectively actuated to affect behavior of the aircraft during flight and/or landing. For instance, a spoiler pivotably coupled to a wing of an aircraft may be raised relative to the wing surface to reduce lift and increase drag. An aileron coupled to the wing may be deflected upward or downward to control roll of the aircraft.

SUMMARY

An example spoiler actuation system includes a rotary actuator, a first output shaft coupled to the rotary actuator, a second output shaft coupled to the rotary actuator, the first output shaft opposite the second output shaft, a first actuator rod coupled to the spoiler at a first location, and a second actuator rod coupled to the spoiler at a second location. The second location is spaced apart from the first location. The rotary actuator is operatively coupled to the first actuator rod via the first output shaft and to the second actuator rod via the second output shaft to cause the spoiler to move between one of a stowed position and a raised position or the stowed position and a drooped position.

An example aircraft includes a spoiler, a rotary actuator, a first rib coupled to the spoiler, a first actuator rod coupled to the spoiler and the first rib, a second rib coupled to the spoiler, and a second actuator rod coupled to the spoiler and the second rib. The rotary actuator is disposed between the first rib and the second rib. The rotary actuator is operatively coupled to the spoiler via the first actuator rod and the second actuator rod to cause the spoiler to move between one of a stowed position and a raised position or the stowed position and a drooped position.

Another example spoiler actuation system includes a rotary actuator, a first actuator rod coupled to a first portion of a spoiler, and a second actuator rod coupled to a second portion the spoiler. The first portion is spaced apart from the second portion. The example spoiler actuation system includes first means for displacing the first actuator rod and second means for displacing the second actuator rod. The first means for displacing and the second means for displacing are operatively coupled to the rotary actuator. In the example spoiler actuation system, displacement of the first actuator rod via the first means for displacing and displacement of the second actuator rod via the second means for displacing are to cause the spoiler to move.

Figure 1:
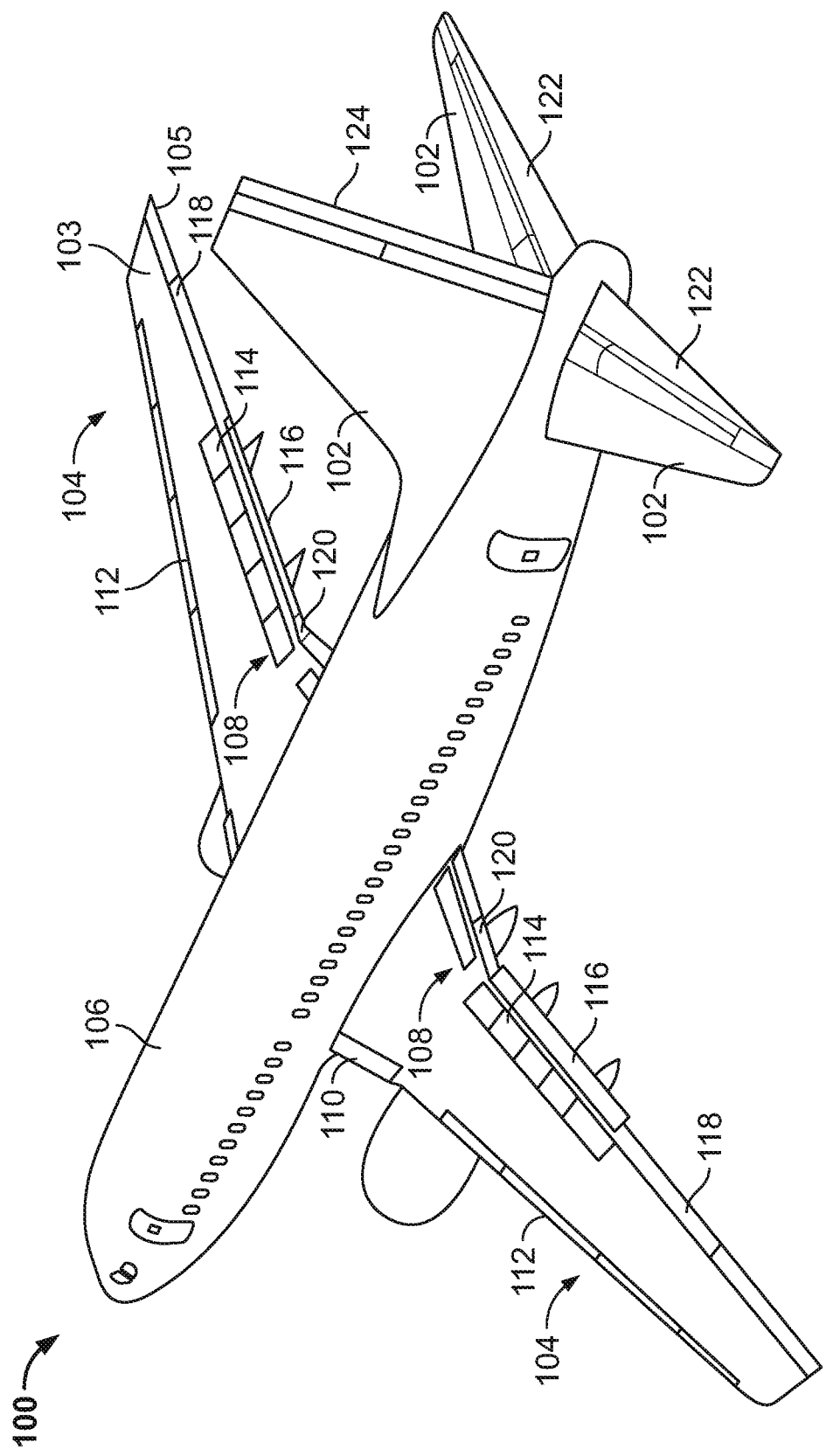
FIG. 1 illustrates an example aircraft in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An aircraft such as a fixed-wing plane includes control surfaces coupled to a wing of the aircraft that are selectively actuated to affect behavior of the aircraft during flight and/or landing. For instance, a spoiler pivotably coupled to a wing of an aircraft may be raised relative to the wing surface to reduce lift and increase drag. Some known spoilers are actuated via a linear actuator (e.g., a linear hydraulic actuator) that is coupled to an edge of the spoiler. The linear actuator is supported by an actuator rib that is also coupled to the edge of the spoiler and that facilitates movement of the spoiler (e.g., pivoting of the spoiler) between a stowed position and a raised position in response to actuation by the liner actuator. In such known spoiler assemblies, two auxiliary ribs are coupled to the spoiler on opposite sides of the actuator rib that supports the linear actuator. The auxiliary ribs support the spoiler during movement of the spoiler by the linear actuator.

Thus, in some known spoiler assemblies, the linear actuator is coupled to the spoiler at one location. In such known spoiler assemblies, rotation of the spoiler is controlled at the locations on the spoiler where the linear actuator and the rib supporting the linear actuator couple to the spoiler. Although the auxiliary ribs support the spoiler, movement of the spoiler is substantially constrained by the linear actuator at the location where the actuator couples with the spoiler. Therefore, portions of the spoiler that are distal to the actuator coupling location (e.g., portions proximate to the ends of the spoiler) are substantially unconstrained. As a result, one or more portions of the spoiler, such as a tip of the spoiler (e.g., an edge of the spoiler opposite the edge to which the linear actuator is coupled), may deflect during flight. The deflections of the spoiler can vary in magnitude across the length of the spoiler due to the single coupling location of the linear actuator to the spoiler. When the spoiler is coupled to an upper surface of a wing, the varying deflections of the spoiler can result in the formation of gaps of different sizes between the spoiler and a flap located on a lower surface of the wing below the spoiler. Deflections of the spoiler that occur during a cruising state of flight and the resulting gaps formed between the spoiler and the wing surface (e.g., between the spoiler and the flap) can increase drag on the wing and affect performance of the aircraft during flight. Also, as a result of the direct coupling of the linear actuator to the edge of the spoiler, the linear actuator consumes space in the area proximate to the spoiler and can interfere with other components of the wing, such as electrical wires disposed proximate to spoiler.

Disclosed here are example actuators that faciliate synchronized actuation of a first portion of a control surface such as a spoiler (e.g., proximate to a first end of the spoiler) and a second portion of the spoiler (e.g., proximate to a second end of the spoiler) via a rotary actuator. In examples disclosed herein, the rotary actuator includes two output shafts that are operatively coupled to respective portions of the spoiler via actuator rods. As a result of the operative coupling of the rotary actuator to the spoiler at two locations on the spoiler, examples disclosed herein provide for improved control of movement of the spoiler as compared to known spoilers including a linear actuator coupled to the spoiler at one location. Examples disclosed herein provide for two stiff actuator coupling locations on the spoiler, as compared to one actuator coupling location and two auxiliary rib couplings that are independent of the actuator coupling as in known spoiler actuation systems.

In examples disclosed herein, the dual output drives of the actuator control movement of the spoiler at two locations on the spoiler at the same time or substantially the same time. As a result, examples disclosed herein increase stiffness and strength of the spoiler-actuator assembly and improve positional control of the spoiler as compared to known spoilers that include one actuator coupling location. Further, examples disclosed herein reduce deflections at the ends of the spoiler and provide for a consistently sized gap between the spoiler and a wing surface (e.g., a trailing edge flap) as compared to known spoilers that include one actuator coupling location and permit unconstrained deflections of the spoiler.

In examples disclosed herein, the rotary actuator enables the spoiler to move between the stowed position and a drooped position (e.g., a lowered position relative to the stowed position) to provide for aerodynamic control of the aircraft. Some examples disclosed herein use universal joints to couple the rotary actuator output shafts to respective crank arms, where the crank arms drive displacement of the actuator rods coupled to the spoiler, which causes the spoiler to move. The universal joints accommodate misalignments between the output shafts and the crank arms that can arise during assembly and/or during movement of the spoiler. Examples disclosed herein permit the actuator rods and supporting ribs to be positioned along the edge of the spoiler independent of the rotary actuator during assembly. Such flexible assembly enables the example spoiler actuation systems disclosed herein to be used with different spoiler designs (e.g., length) and/or wing designs.

FIG. 1 illustrates an example aircraft 100 in which the examples disclosed herein may be implemented. In the illustrated example, the aircraft 100 includes stabilizers 102 and wings 104 coupled to a fuselage 106. The wings 104 define upper and lower surfaces (e.g., upper and lower sides, upper and lower aerodynamic surfaces, etc.) 103, 105, respectively. The wings 104 of the aircraft 100 have control surfaces 108 located along the leading and/or trailing edges of the wings 104. The control surfaces 108 may be displaced or adjusted (e.g., angled, etc.) to provide lift during takeoff, landing and/or flight maneuvers. In some examples, the control surfaces 108 are operated (i.e., displaced) independently of one another. The control surfaces 108 include leading edge flaps 110, leading edge slats 112, upper spoilers 114 (e.g., flight spoilers, ground spoilers, upper surface spoilers, etc.), and trailing edge flaps (e.g., rotatable flaps) 116. The control surfaces 108 of the illustrated example also include ailerons 118 and flaperons 120. In this example, the stabilizers 102 include elevators 122 and a rudder 124.

To control flight of the aircraft 100, the upper surface spoilers 114 of the illustrated example alter the lift and drag of the aircraft 100. The flaps 116 alter the lift and pitch of the aircraft 100. The ailerons 118 and the flaperons 120 of the illustrated example alter the roll of the aircraft 100. In this example, the slats 112 alter the lift of the aircraft 100. The control surfaces 108 of the illustrated example also play a role in controlling the speed of the aircraft 100. For example, the upper surface spoilers 114 may be used for braking of the aircraft 100. Any of the control surfaces 108 of the illustrated example may be independently moved (e.g., deflected) to control the load distribution in different directions over the respective wings 104, thereby directing movement of the aircraft 100.

The examples described herein may be applied to control surfaces associated with any of the stabilizers 102, the wings 104 and/or any other exterior or outboard structure (e.g., a horizontal stabilizer, a wing strut, an engine strut, a canard stabilizer, etc.) of the aircraft 100. In particular, the wings 104 and/or the stabilizers 102 may have control surfaces 108 that can be adjusted to maneuver the aircraft 100 and/or control a speed of the aircraft 100, for example. Additionally or alternatively, in some examples, the fuselage 106 has control surfaces, which may be deflected, to alter the flight maneuvering characteristics during cruise and/or takeoff of the aircraft 100. Thus, the discussion of examples disclosed herein in connection with spoilers is for illustrated purposes only and does not limit the examples to use only with spoilers.

Figure 2:
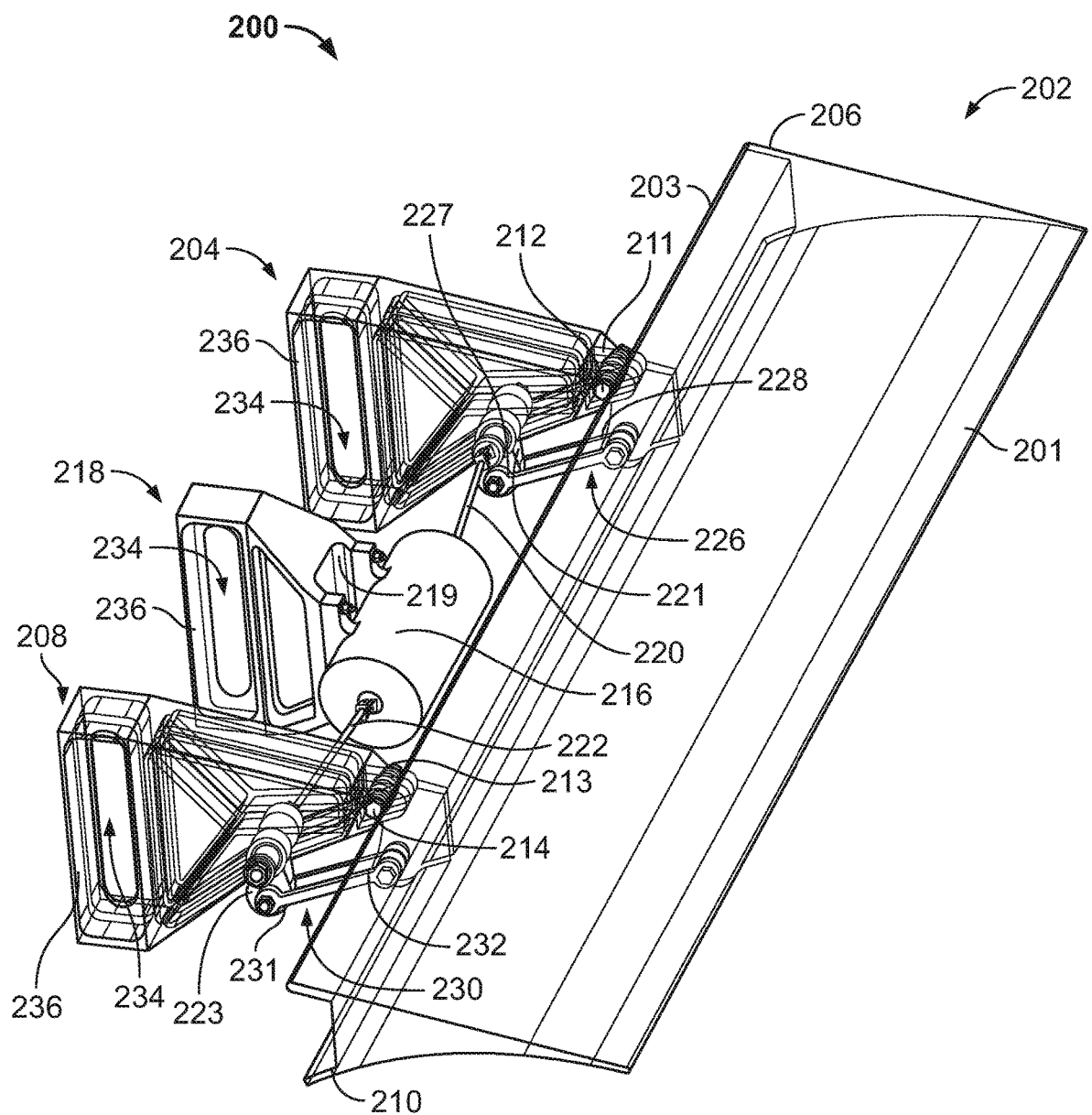
FIG. 2 is a perspective view of an example spoiler assembly in accordance with teachings of this disclosure.

FIG. 2 illustrates an example spoiler assembly 200 in accordance with teachings of this disclosure. The example spoiler assembly 200 includes a spoiler 202 that defines a control surface of an aircraft (e.g., the control surface 108 of the aircraft 100 of FIG. 1). The example spoiler 202 includes a first edge 201 and a second edge 203 opposite the first edge 201. In operation, the first edge 201 of the spoiler 202 can be disposed proximate to, for instance, a trailing edge of a wing (e.g., the wing 104 of FIG. 1), where the first edge 201 deflects upward or downward relative to the wing surface during movement of the spoiler 202.

The example spoiler assembly 200 includes a first rib 204 coupled to the second edge 203 of the spoiler 202 proximate to a first end 206 of the spoiler 202. In particular, a first end 211 of the first rib 204 is coupled to the spoiler 202 via a first rib fastener 212 (e.g., a mechanical fastener such as a hinge fastener). Similarly, the example spoiler assembly 200 includes a second rib 208 coupled to the second edge 203 of the spoiler 202 proximate to a second end 210 of the spoiler 202 opposite the first end 206. A first end 213 of the second rib 208 is coupled to the spoiler 202 via a second rib fastener 214. In the example of FIG. 2, the first and second ribs 204, 208 are aligned relative to the second edge 203 of the spoiler 202 such that a longitudinal axis (FIG. 4) extends through the first rib fastener 212 and the second rib fastener 214. As disclosed herein, the spoiler 202 pivots about the shared axis extending through the first and second rib fasters 212, 214 as the spoiler 202 moves between a stowed position and deployed position(s).

In operation, the ribs 204, 208 can be coupled to, for instance, a spar of a wing that includes the spoiler 202. Thus, each of the ribs 204, 208 provides means for supporting the spoiler 202. The ribs 204, 208 can be coupled to other portions of an aircraft (e.g., a horizontal stabilizer) in view of the location of the control surface that the ribs 204, 208 support. In the example of FIG. 2, the first and second ribs 204, 208 are substantially identical. In other examples, one or more properties of the ribs 204, 208 (e.g., width) may be different.

The example spoiler assembly 200 includes a rotary actuator 216 to cause the spoiler 202 to move between a stowed position shown in FIG. 2 and a deployed position (e.g., based on instructions from a processor communicatively coupled to the rotary actuator 216). In particular, the rotary actuator 216 actuates the spoiler 202 to move from the stowed position shown in FIG. 2 to a raised position in which the first edge 201 of the spoiler 202 is elevated relative to the second edge 203 of the spoiler 202. The rotary actuator 216 actuates the spoiler 202 to move from the stowed position of FIG. 2 to a drooped position in which the first edge 201 of the spoiler 202 is lowered relative to the second edge 203 of the spoiler 202. The rotary actuator 216 of FIG. 2 can be driven by hydraulic, electrical, or mechanical inputs.

In the example of FIG. 2, the rotary actuator 216 is supported by a third rib 218. For instance, the rotary actuator 216 is coupled to a first end 219 of the third rib 218. The third rib 218 can be coupled to, for instance, the spar of the aircraft wing to which the first and second ribs 204, 208 are coupled. Thus, the example third rib 218 provides means for supporting the rotary actuator 216. In the example of FIG. 2, the third rib 218 and, thus, the rotary actuator 216 are disposed between the first rib 204 and the second rib 208.

As illustrated in FIG. 2, each of the ribs 204, 208, 218 defines an opening 234 therein at a second end 236 of the respective ribs 204, 208, 218. When the example spoiler assembly 200 of FIG. 2 is installed in, for instance, a wing of an aircraft, components of the wing such as electrical wires can be routed through the openings 234 of the ribs 204, 208, 218. The openings 234 can help organize and/or secure the wires. As shown in FIG. 2, the openings 234 are formed in portions of the ribs 204, 208, 218 that are distal to the second edge 203 of the spoiler 202. As result, the electrical wires can be threaded through the openings 234 without interference from the rotary actuator 216 and/or the spoiler 202. In some examples, the respective openings 234 of the ribs 204, 208, 218 are at least partially aligned relative to one another to provide for a pathway for routing the wires and/or other components of the wing.

As shown in FIG. 2, the first rib 204 includes a first crank arm 221 pivotably coupled thereto. Also, the second rib 208 includes a second crank arm 223 pivotably coupled thereto. The example rotary actuator 216 includes a first shaft 220 that operatively couples the rotary actuator 216 to the first crank arm 221. The rotary actuator 216 includes a second shaft 222 that operatively couples the rotary actuator 216 to the second crank arm 223. As shown in FIG. 2, the first shaft 220 and the second shaft 222 extend from opposite ends of the rotary actuator 216.

In FIG. 2, each of the crank arms 221, 223 is coupled to an actuator rod that extends between the respective crank arms 221, 223 and the spoiler 202 to facilitate movement of the spoiler 202 between the stowed position and the raised position or between the stowed position and the drooped position. In particular, the example spoiler assembly of FIG. 2 includes a first actuator rod 226 and a second actuator rod 230. The first actuator rod 226 includes a first end 227 coupled to the first crank arm 221 and a second end 228 coupled to the second edge 203 of the spoiler 202. Thus, the first actuator rod 226 operatively couples the rotary actuator 216 to a first portion of the spoiler 202 (e.g., a portion of the spoiler 202 proximate to the first end 206). The first actuator rod 226 can be coupled to the crank arm 221 and the second edge 203 of the spoiler 202 via mechanical fasteners. Similarly, the second actuator rod 230 includes a first end 231 coupled to the second crank arm 223 and a second end 232 coupled to the second edge 203 of the spoiler 202 via respective mechanical fasteners.

As disclosed herein, the shafts 220, 222 of the rotary actuator 216 transfer rotational motion to the corresponding crank arms 221, 223 to raise or lower the spoiler 202. The rotation of the shafts 220, 222 and, thus, the crank arms 221, 223, in a first direction (e.g., a counter-clockwise direction) displaces the actuator rods 226, 230, which causes the spoiler 202 to move upward as the spoiler 202 pivots about the rib fasteners 212, 214. The rotation of the crank arms 221, 223 in a second direction (e.g., a clockwise direction) displaces the actuator rods 226, 230, which causes the spoiler 202 to move downward as the spoiler pivots about the rib fasteners 212, 214. Thus, each of the crank arms 221, 223 provides means for displacing the corresponding actuator rod 226, 230 coupled thereto. The single actuator 216 of the example spoiler assembly 200 of FIG. 2 provides a dual drive output that is used to position the spoiler 202.

The example spoiler assembly 200 of FIG. 2 provides for a compact spoiler control assembly in view of the use of the rotary actuator 216 and the coupling of the rotary actuator 216 to the ribs 204, 208 via the output shafts 220, 222. The rotary actuator 216 consumes a smaller volume than a linear actuator that may require extra space to be reserved within the wing to accommodate movement of the linear actuator when in operation. In the example spoiler assembly 200 of FIG. 2, the actuation of the spoiler 202 is provided by rotation of the output shafts 220, 222 extending from the rotary actuator 216. As a result, extra space in the wing does not need to be reserved for the rotary actuator 216 to accommodate movement of the rotary actuator 216 when in operation. Further, the placement of the rotary actuator 216 proximate to the second edge 203 of the spoiler 202 between the ribs 204, 208, 218 minimizes interference of the spoiler assembly 200 with other components of the wing. In some examples, the rotary actuator 216 weighs less than a linear actuator, thereby reducing an overall weight of the spoiler assembly 200 and, thus, weight of the aircraft.

Figure 3:
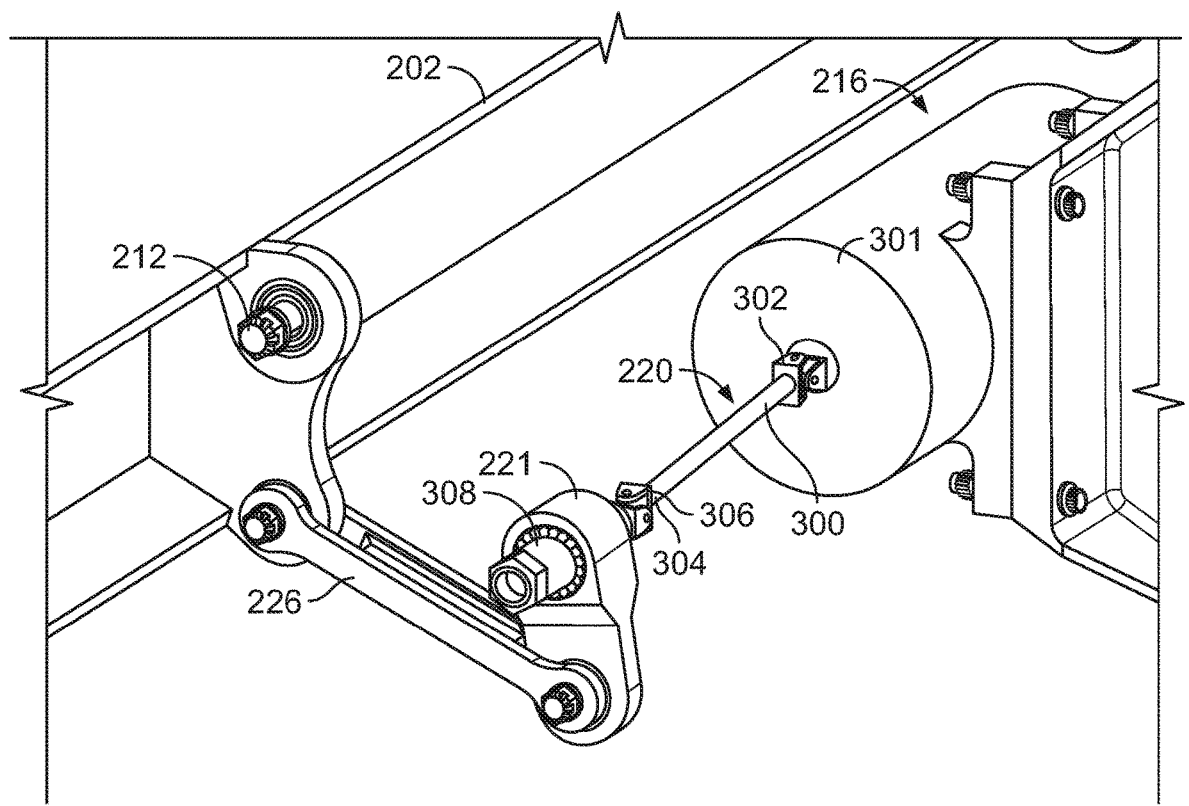
FIG. 3 is a partial perspective view of the example spoiler assembly of FIG. 2.

FIG. 3 is a partial side, perspective view of the example spoiler assembly 200 of FIG. 2 and, in particular, shows the couplings between the first shaft 220 of the rotary actuator 216, the first crank arm 221, and the first actuator rod 226. For illustrative purposes, the first rib 204 is not shown in FIG. 3. The couplings between the second shaft 222 of the rotary actuator 216, the second crank arm 223, and the second push rod 230 are identical to the example couplings shown in FIG. 3 and are discussed in connection with FIG. 4.

In the example of FIG. 3, a first end 300 of the first shaft 220 is coupled to a first end 301 of the rotary actuator 216 via a first universal joint 302. A second end 304 of the first shaft 220 is coupled to the first crank arm 221 via a spline 308. The spline 308 facilitates the transfer torque from the output shaft 220 to the first crank arm 221 during operation of the rotary actuator 216. In the example of FIG. 3, the second end 304 of the first shaft 220 is coupled to the spline 308 via a second universal joint 306. As disclosed herein, the first crank arm 221 is coupled to the spoiler 202 via the first actuator rod 226. Rotation of the first crank arm 221 causes the spoiler 202 to pivot about the first rib fastener 212 (to which the rib 204 is coupled (FIG. 2) and move from the stowed position to the raised position or the drooped position.

Figure 4:
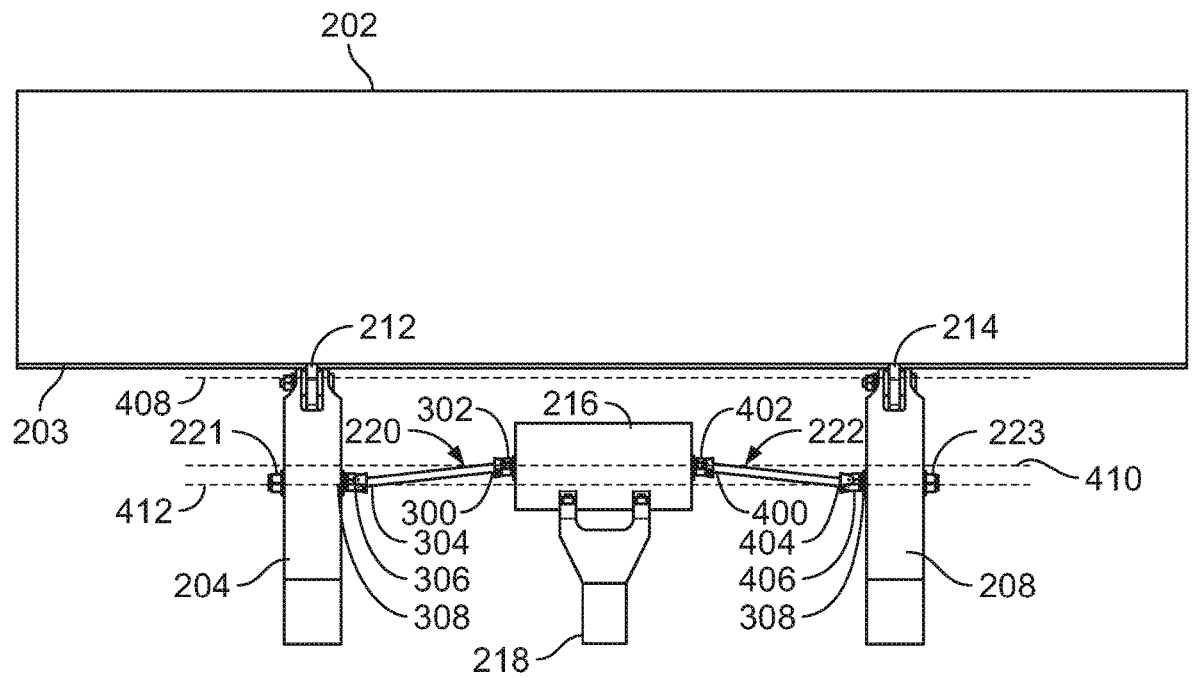
FIG. 4 is a top view of the example spoiler assembly of FIG. 2.
Figure 5:
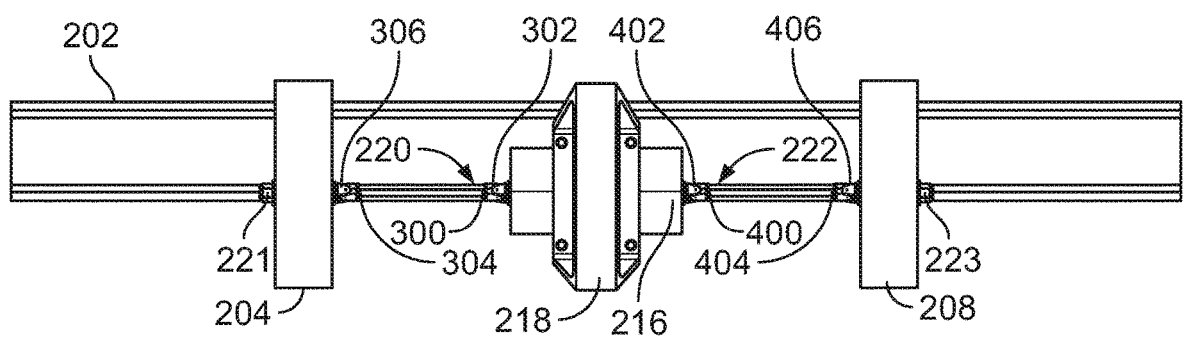
FIG. 5 is a rear view of the example spoiler assembly of FIG. 2.

FIG. 4 is a top view of the example spoiler assembly 200 of FIGS. 2 and 3. FIG. 5 is a rear view of the example spoiler assembly 200 of FIGS. 2 and 3. As shown in FIGS. 4 and 5, the second shaft 222 includes a first end 400 coupled to the rotary actuator 216 via a third universal joint 402 and a second end 404 coupled to the second crank arm 223 via a fourth universal joint 406 (e.g., wherein the second crank arm 223 is splined to the fourth universal joint 406). In the example spoiler assembly 200 of FIGS. 2-5, the universal joints 300, 306 that couple the first shaft 220 to the rotary actuator 216 and the first crank arm 221 permit misalignment between the first shaft 220 and the first crank arm 221 that can arise, for instance, during flight of the aircraft due to elasticity of the wing that includes the spoiler 202 (e.g., the wing of the aircraft can bend across its span during flight). Similarly, the universal joints 402, 406 that couple the second shaft 222 to the rotary actuator 216 and the second crank arm 223 permit misalignment between the second shaft 222 and the second crank arm 223 that can arise during movement of the spoiler 202.

As shown in FIG. 4, the first and second ribs 204, 208 are aligned relative to the second edge 203 of the spoiler 202 such that a first axis 408 passes through the first rib fastener 212 that couples the first rib 204 to the spoiler 202 and the second rib fastener 214 that couples the second rib 208 to the spoiler 202 via the pivotable coupling between the ribs 204, 208 and the spoiler 202. During movement of the spoiler 202, the spoiler 202 pivots about the first axis 408. The shared axis 408 passing through the first and second rib fasteners 212, 214 provides for synchronized movement of the spoiler 202 across a length of the spoiler 202.

As also shown in FIG. 4, a second axis 410 passes through the rotary actuator 216 at the locations where the respective ends 300, 400 of the shafts 220, 222 couple to the rotary actuator 216 via the universal joints 302, 402. The ends 300, 400 of the respective shafts 220, 222 rotate about the second axis 410 based on operation of the rotary actuator 216.

Also, a third axis 412 passes though the crank arms 221, 223 at the locations where the respective ends 304, 404 of the crank arms 221, 223 couple with the shafts 220, 222 via the respective splines 308. In the example spoiler assembly 200 of FIGS. 2-5, the splines 308 are coaxial. The crank arms 221, 223 rotate about the third axis 412 in response to the transfer of rotational motion by the shafts 220, 222 (e.g., via the spline 308).

As shown in FIG. 4, the second axis 410 that passes through the rotary actuator 216 at the output shafts 220, 222 is offset relative to the third axis 412 that passes through the locations where the shafts 220, 222 couple with the corresponding crank arms 221, 223. The offset between the axes 410, 412 provides for increased degrees of freedom of movement of the shafts 220, 222. The offset between the axes 410, 412 also provides for flexibility in the positioning of the rotary actuator 216 relative to the crank arms 221, 223 and the spoiler 202.

Although in the example of FIGS. 2-5, a distance between the rotary actuator 216 and the first rib 204 is shown as substantially equal to a distance between the rotary actuator 216 and the second rib 208, in other examples the rotary actuator 216 can be offset relative to one of the ribs 204, 208 and thus, one side of the spoiler 202. In such examples, lengths of the respective output shaft(s) 220, 222 are selected to accommodate the respective distances between the rotary actuator 216 and the first rib 204 and the rotary actuator 216 and the second rib 208. In the example of FIGS. 2-5, the output shafts 220, 222 provide for the transfer of rotational motion to the respective crank arms 221, 223 without affecting or substantially affecting the synchronized movement of the spoiler 202 via the crank arms 221, 223 and the actuator rods 226, 230. Conversely, if a linear actuator were offset relative to the one side of the spoiler 202, control of the movement of the spoiler 202 by the linear actuator would vary between the portion of spoiler proximate to the linear actuator and the portion of the spoiler distal to the linear actuator. During assembly, the respective spacings between the rotary actuator 216 and the ribs 204, 208 can be selected to accommodate other components of the wing (e.g., mechanical and/or electrical components) proximate to the spoiler 202. In some examples, during installation, the rotary actuator 216 and the ribs 204, 208 are positioned independently of one another, which provides for flexibility in assembling the example spoiler assembly 200. Thus, the example spoiler assembly 200 accommodates variances in placement of the rotary actuator 216 and/or the ribs 204, 208 while maintaining synchronized rotation of the spoiler 202 about the first axis 408.

Figure 6:
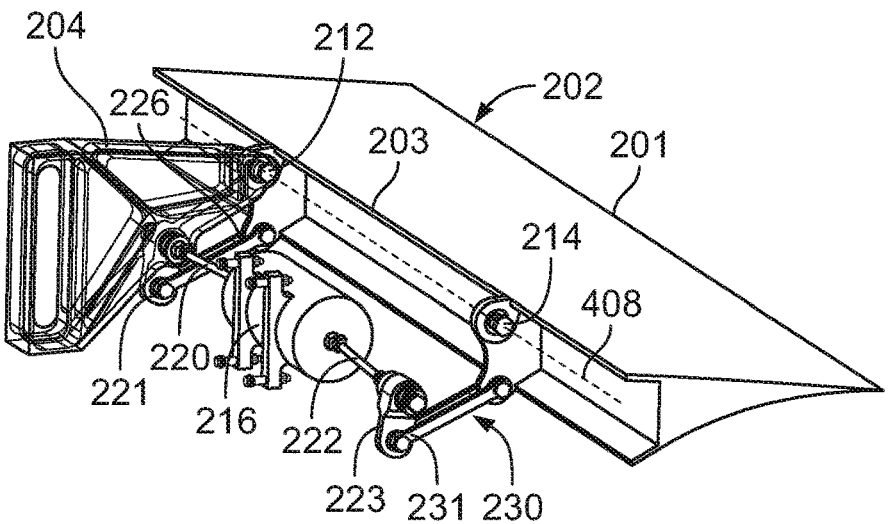
FIG. 6 illustrates the example spoiler assembly of FIGS. 2-5 in a stowed position.
Figure 7:
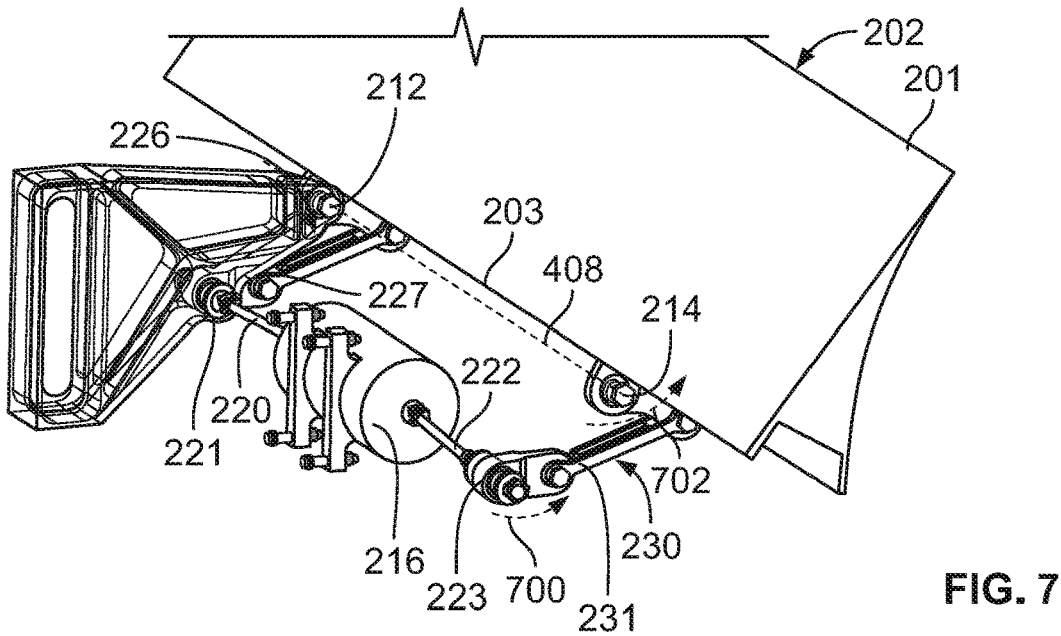
FIG. 7 illustrates the example spoiler assembly of FIGS. 2-5 in a raised position.
Figure 8:
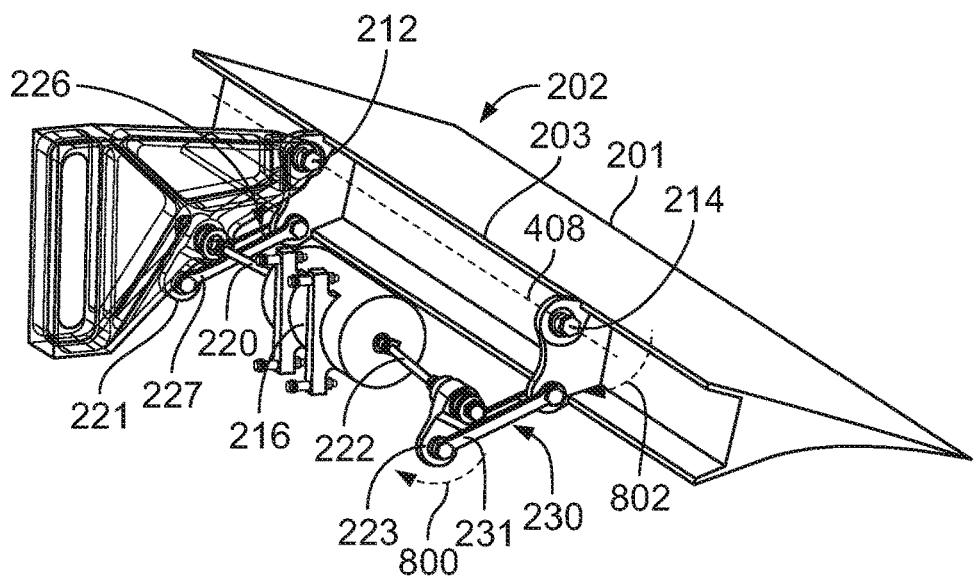
FIG. 8 illustrates the example spoiler assembly of FIGS. 2-5 in a drooped position.

FIGS. 6-8 show movement of the spoiler 202 via the example spoiler assembly 200 between a stowed position (FIG. 6) and a raised position (FIG. 7) and the stowed position (FIG. 6) and a drooped position (FIG. 8). For illustrative purposes, only the first rib 204 is shown in FIGS. 6-8.

As shown in FIG. 7, to move the example spoiler 202 from the stowed position of FIG. 6 to the raised position, the crank arms 221, 223 rotate via the rotary actuator 216 and the shafts 220, 222 in a first direction (e.g., counterclockwise) toward the second edge 203 of the spoiler 202, as represented by arrow 700 in FIG. 7. As a result, the respective ends 227, 231 of the actuator rods 226, 230 that are coupled to the crank arms 221, 223 are displaced relative to the position of the actuator rod ends 227, 231 when the spoiler 202 is in the stowed position of FIG. 6. The displacement of the ends 227, 231 of the actuator rods 226, 230 via rotation of the crank arms 221, 223 in the first direction causes the spoiler 202 to pivot about the first axis 408 extending through the rib fasteners 212, 214 in a first direction as represented by the arrow 702 of FIG. 7. The pivoting of the spoiler 202 about the first axis 408 in the first direction causes the first edge 201 of the spoiler 202 to move upward relative to the stowed position of FIG. 6.

In operation, external pressures are exerted on the spoiler 202. The spoiler 202 can be subject to increased loads when the spoiler 202 is in the raised position of FIG. 7. In the example spoiler assembly 200, the actuator rods 226, 230 and the crank arms 221, 223 provide the rotary actuator 216 with a mechanical advantage in view of the external pressures exerted on the spoiler. For example, when the spoiler 202 is in the raised position of FIG. 7, the actuator rods 226, 230 are oriented such that the respective lines of action of the actuator rods 226, 230 are oriented proximate to the first axis 408 passing through the rib fasteners 212, 214. As a result, the moment arm of the actuator rods 226, 230 are smaller than if the actuator rods 226, 230 were positioned farther away from the first axis 408 and the actuator 216 is subject to reduced reaction loads when the spoiler 202 is in the raised position.

As shown in FIG. 8, to move the spoiler 202 from the stowed position of FIG. 6 to the drooped position, the crank arms 221, 223 rotate via the rotary actuator 216 and the shafts 220, 222 in a second direction (e.g., clockwise) away from the second edge 203 of the spoiler 202, as represented by arrow 800 in FIG. 8. As a result, the respective ends 227, 231 of the actuator rods 226, 230 that are coupled to the crank arms 221, 223 are displaced relative to the position of the actuator rod ends 227, 231 when the spoiler 202 is in the stowed position of FIG. 6. In particular, the ends 227, 231 are displaced in an opposite direction than the displacement that occurs when the spoiler is raised (FIG. 7). The displacement of the ends 227, 231 of the actuator rods 226, 230 via rotation of the crank arms 221, 223 in the second direction causes the spoiler 202 to pivot about the first axis 408 in a second direction, as represented by the arrow 802 of FIG. 8. The pivoting of the spoiler 202 about the first axis 408 in the second direction causes the first edge 201 of the spoiler 202 to move downward relative to the stowed position of FIG. 6 to lower the spoiler relative to the stowed position of FIG. 6.

Figure 9:
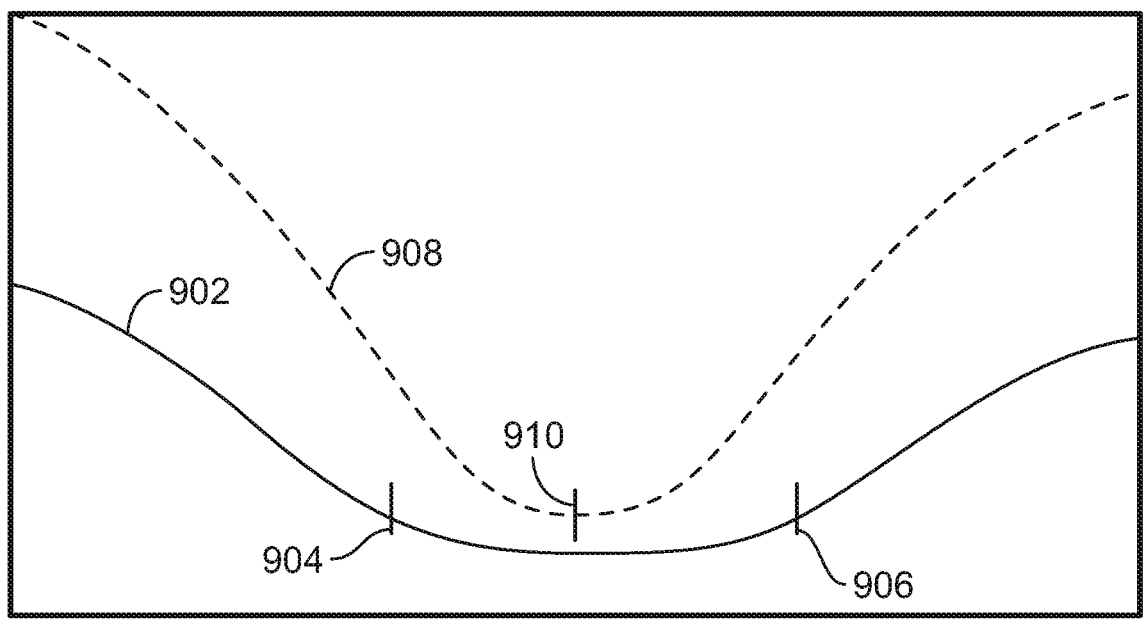
FIG. 9 is a graph illustrating deflections of a spoiler of a known spoiler assembly including a linear actuator and deflections of a spoiler of an example spoiler assembly including a rotary actuator in accordance with teachings of this disclosure.

FIG. 9 is an example graph 900 illustrating (1) defection of a tip of a spoiler controlled via a known spoiler assembly including a linear actuator and (2) a deflection of a tip of a spoiler (e.g., the spoiler 202 of FIG. 2) controlled via the example spoiler assembly 200 of FIG. 2.

Line 902 in the graph 900 of FIG. 9 represents deflections of the tip of the spoiler (e.g., the first edge 201 of the spoiler 202 of FIG. 2) controlled by the example spoiler assembly 200 of FIGS. 2-8. Also, lines 904 and 906 in FIG. 9 represent the two attachment locations of the rotary actuator to the spoiler via the actuator rods (e.g., the actuator rods 226, 230) that are coupled to the output shafts (e.g., the output shafts 220, 222) of the rotary actuator in the example spoiler assembly 200 of FIGS. 2-8.

Line 908 in the graph 900 represents deflections of the spoiler controlled by a linear actuator. Line 910 in FIG. 9 represents the linear actuator attachment point in known spoiler assembles. As mentioned above, known example spoiler assemblies include two auxiliary ribs that are coupled to the spoiler but are independent of the linear actuator.

As shown in FIG. 9, the dual coupling of the rotary actuator of the example spoiler assembly 200 of FIGS. 2-8 provides for increased control of spoiler deflections proximate to a center of the spoiler and reduces deflections of the ends of the spoiler as compared to known spoiler assemblies that include one attachment point between the spoiler and the linear actuator. In some examples, the positions of the two attachment points of the actuator rods to the spoiler in the example spoiler assembly 200 of FIGS. 2-8 can be adjusted to meet particular deflection curve criteria. Thus, example spoiler assembly of FIGS. 2-8 provides for improved control of the spoiler movement and reduces the deflections of the spoiler that can create gaps between the spoiler and a flap affect aerodynamic performance.

Figure 10:
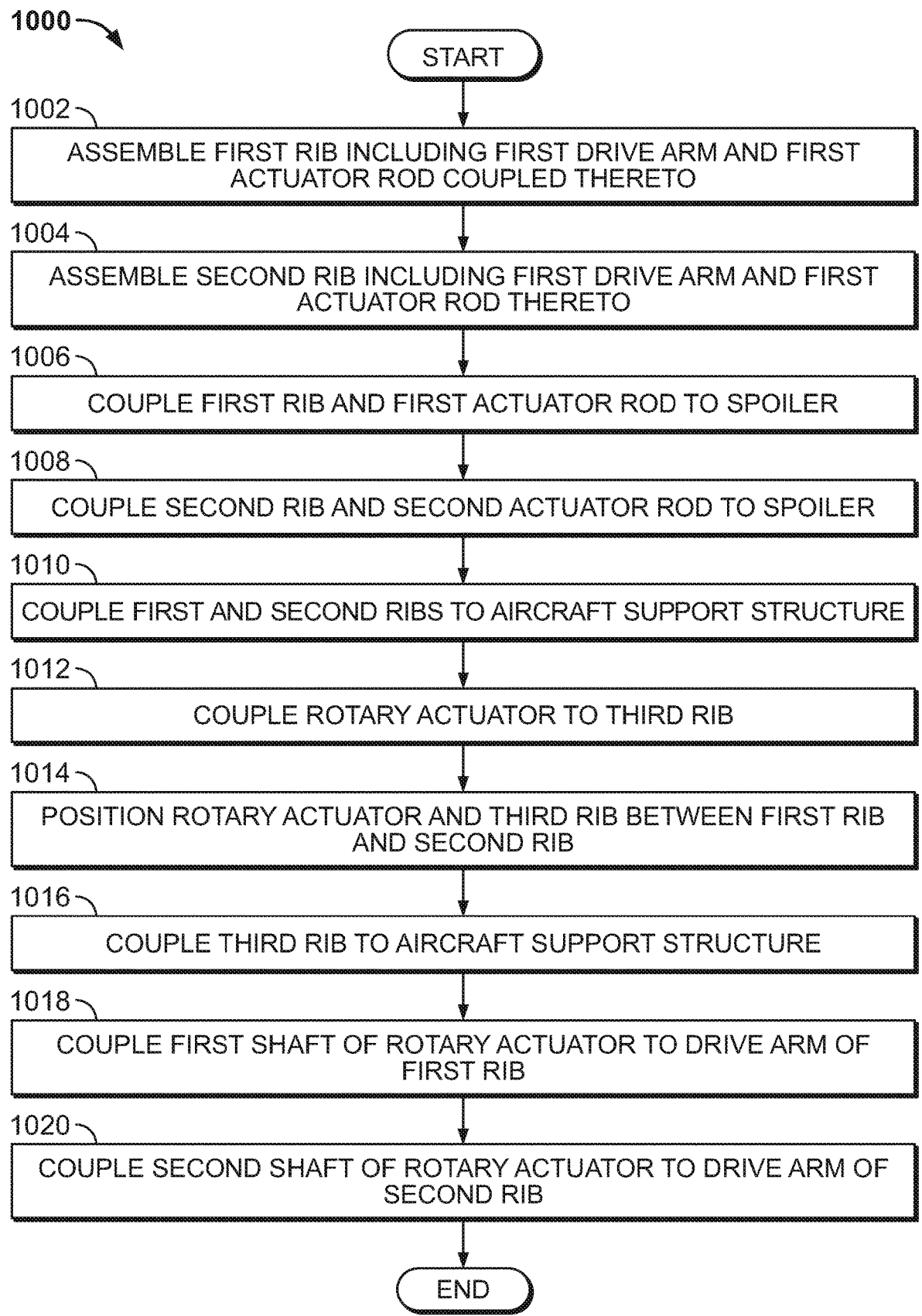
FIG. 10 is a flowchart of an example method to assemble a spoiler assembly including a rotary actuator operatively coupled to a spoiler in accordance with teachings of this disclosure.

FIG. 10 is a flowchart of an example method 1000 to assemble a spoiler assembly including a rotary actuator operatively coupled to a spoiler in accordance with teachings of this disclosure. The example method 1000 includes assembling a first rib including a first crank arm and a first actuator rod coupled thereto (block 1002) and assembling a second rib including a second crank arm and a second actuator rod coupled thereto (block 1004). For example, the first crank arm 221 is pivotably coupled to the first rib 204 (e.g., via a mechanical fastener). The first actuator rod 226 includes a first end 227 coupled to the first crank arm 221. Similarly, the second crank arm 223 is pivotably coupled to the second rib 208 (e.g., via a mechanical fastener) and a first end 231 of the second actuator rod 230 is coupled to the second crank arm 223.

The example method 1000 of FIG. 10 includes coupling the first rib and the first actuator rod to a spoiler (block 1006) and coupling the second rib and the second actuator rod to the spoiler (block 1008). For example, the first rib 204 is coupled to the second edge 203 of the spoiler 202 via a first rib fastener 212. An end 228 of the first actuator rod 226 opposite the end 227 of the first actuator rod 226 that is coupled to the first crank arm 221 is coupled the second edge 203 of the spoiler 202 via another mechanical fastener. The second rib 208 is coupled to the second edge 203 of the spoiler 202 via a second rib fastener 214. An end 232 of the second actuator rod 230 is coupled the second edge 203 of the spoiler 202 via another mechanical fastener, wherein the end 232 is opposite the end 231 of the second actuator rod 226 that is coupled to the second crank arm 223.

The example method 1000 includes coupling the first and second ribs to a support structure of an aircraft (block 1010). For example, the first and second ribs 204, 208 can be coupled to a spar of an aircraft wing.

The example method 1000 of FIG. 10 includes coupling a rotary actuator to a third rib (block 1012). For example, the rotary actuator 216 is coupled to the third rib 218 via one or more fasteners (e.g., mechanical fasteners, chemical fasteners).

The example method 1000 includes positioning the rotary actuator and the third rib between the first and second ribs (block 1014). For example, the rotary actuator 216 can be positioned at a midpoint location between the first and second ribs 204, 208 or offset relative to one of the ribs 204, 208, based on, for instance, the presence of other components of the aircraft proximate to the spoiler 202. The third rib 218 can be aligned with the first and second ribs 204, 208 such that openings 234 defined in each of the ribs 204, 208, 218 are substantially aligned to enable, for instance, electrical wires to be routed through the openings 234.

The example method 1000 includes coupling the third rib to the support structure of the aircraft (block 1016). The third rib 218 can be coupled to, for instance, the spar of the aircraft wing to which the first and second ribs 204, 208 are coupled.

The example method 1000 includes coupling a first shaft of the rotary actuator to the crank arm of the first rib (block 1018) and coupling a second shaft of the rotary actuator to the crank arm of the second rib (block 1020). For instance, the first shaft 220 of the rotary actuator 216 is coupled to the first crank arm 221 via a spline 308 (e.g., where the first shaft 220 is coupled to the spline 308 via a universal joint 306). The second shaft 222 of the rotary actuator 216 is coupled to the second crank arm 223 via a spline 308 (e.g., where the second shaft 223 is coupled to the spline 308 via a universal joint 406). In operation, the coupling of the actuator output shafts 220, 222 to the crank arms 221, 223 provides for the transfer to torque to the crank arms 221, 223 and enables the rotary actuator 216 to actuate the spoiler 202 between the stowed position, the raised position, and the drooped position.

Although the example method 1000 is described with reference to the flowchart illustrated in FIG. 10, many other methods of manufacturing a spoiler assembly including a rotary actuator operatively coupled to a spoiler may alternatively be used. For example, the order of execution of the blocks may be changed, and/or some of the blocks described may be changed, eliminated, or combined. Similarly, additional operations may be included in the example method of FIG. 10 before, in between, or after the blocks shown in FIG. 10.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that provide for control of a spoiler using a rotary actuator operatively coupled to the spoiler via two output shafts. Examples disclosed herein include crank arms that couple to the output shafts to enable rotational motion from the rotary actuator to drive synchronized movement of the spoiler at two locations on the spoiler. As a result of control of the spoiler via the two output shafts, deflections of the spoiler are reduced as compared to known spoiler systems including a linear actuator coupled to the spoiler at one location. Examples spoiler control mechanisms disclosed herein have a compact design as compared to known spoiler control mechanisms and provide for improved control of the spoiler.

The following paragraphs provide various examples of the examples disclosed herein Example 1 includes a spoiler actuation system including a rotary actuator; a first output shaft coupled to the rotary actuator; a second output shaft coupled to the rotary actuator, the first output shaft opposite the second output shaft; a first actuator rod coupled to a spoiler at a first location; and a second actuator rod coupled to the spoiler at a second location. The second location is spaced apart from the first location. The rotary actuator is operatively coupled to the first actuator rod via the first output shaft and to the second actuator rod via the second output shaft to cause the spoiler to move between one of a stowed position and a raised position or the stowed position and a drooped position.

Example 2 includes the spoiler actuation system of example 1, wherein the first output shaft is coupled to the rotary actuator via a universal joint.

Example 3 includes the spoiler actuation system of examples 1 or 2, further including a first crank arm, wherein the first output shaft is coupled to a first portion of the first crank arm and the first actuator rod is coupled to a second portion of the first crank arm, the first crank arm to rotate to cause the spoiler to move between the stowed position and the raised position or the stowed position and the drooped position.

Example 4 includes the spoiler actuation system of example 3, wherein the first crank arm is coupled to the first output shaft via a first spline.

Example 5 includes the spoiler actuation system of example 4, further including a second crank arm coupled to the second output shaft via a second spline, the first spline coaxial with the second spline.

Example 6 includes the spoiler actuation system of any of examples 1-5, wherein the first actuator rod is coupled to a rib and the rib is coupled to the spoiler via a first fastener.

Example 7 includes the spoiler actuation system of example 6, wherein the spoiler is to rotate about the first fastener when the spoiler moves.

Example 8 include an aircraft including a spoiler; a rotary actuator; a first rib coupled to the spoiler; a first actuator rod coupled to the spoiler and the first rib; a second rib coupled to the spoiler; and a second actuator rod coupled to the spoiler and the second rib. The rotary actuator is disposed between the first rib and the second rib. The rotary actuator is operatively coupled to the spoiler via the first actuator rod and the second actuator rod to cause the spoiler to move between one of a stowed position and a raised position or the stowed position and a drooped position.

Example 9 includes the aircraft of example 8, wherein the first rib includes a first opening defined therein and the second rib includes a second opening defined therein, the first opening aligned with the second opening.

Example 10 includes the aircraft of example 9, further including a third rib coupled to the rotary actuator, the third rib defining a third opening therein, the third opening aligned with the first opening and the second opening.

Example 11 includes the aircraft of examples 8 or 9, wherein the first rib is coupled to the spoiler via a first fastener and the second rib is coupled to the spoiler via a second fastener, the spoiler to pivot about an axis extending through the first fastener and the second fastener.

Example 12 includes the aircraft of any of examples 8-11, further including a first crank arm coupled to the first rib, the first actuator rod coupled to the first crank arm and a second crank arm coupled to the second rib, the second actuator rod coupled to the second crank arm, the rotary actuator to cause the first crank arm and the second crank arm to rotate to cause the spoiler to move between the stowed position and the raised position or the stowed position and the drooped position.

Example 13 includes the aircraft of example 12, further including a first output shaft coupled to the rotary actuator and the first crank arm and a second output shaft coupled to the rotary actuator and the second crank arm.

Example 14 includes the aircraft of example 13, wherein the first output shaft is coupled to the first crank arm via a spline.

Example 15 includes a spoiler actuation system including a rotary actuator; a first actuator rod coupled to a first portion of a spoiler; a second actuator rod coupled to a second portion the spoiler, the first portion spaced apart from the second portion; first means for displacing the first actuator rod; and second means for displacing the second actuator rod. The first means for displacing and the second means for displacing are operatively coupled to the rotary actuator. Displacement of the first actuator rod via the first means for displacing and displacement of the second actuator rod via the second means for displacing is to cause the spoiler to move.

Example 16 includes the spoiler actuator system of example 15, wherein the first means for displacing includes a first arm coupled to a first shaft of the rotary actuator.

Example 17 includes the spoiler actuator system of example 16, wherein the second means for displacing includes a second arm coupled to a second shaft of the rotary actuator, the first shaft opposite the second shaft.

Example 18 includes the spoiler actuator system of example 16, wherein the first arm is coupled to the first shaft via a spline.

Example 19 includes the spoiler actuation system of example 15, wherein the first means for displacing and the second means for displacing are to cause the first portion of the spoiler to pivot and the second portion of the spoiler to pivot about a shared axis.

Example 20 includes the spoiler actuation system of example 15, further including a first rib coupled to the spoiler and a second rib coupled to the spoiler, the first means for displacing coupled to the first rib and the second means for displacing coupled to the second rib.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A spoiler actuation system comprising:
a rotary actuator;
a first output shaft having a first end and a second end, the first end opposite the second end, the first end of the first output shaft coupled to a first end of the rotary actuator;
a second output shaft having a first end and a second end, the first end opposite the second end, the first end of the second output shaft coupled to a second end of the rotary actuator, the first end of the rotary actuator opposite the second end of the rotary actuator;
a first crank arm, the second end of the first output shaft coupled to the first crank arm, the first end of the first output shaft to rotate about a first axis, the first crank arm to rotate about a second axis, the second axis offset relative to the first axis;
a second crank arm, the second end of the second output shaft coupled to the second crank arm, the first end of the second output shaft to rotate about the first axis, the second crank arm to rotate about the second axis, the second axis offset relative to the first axis;
a first actuator rod coupled to a spoiler at a first location; and
a second actuator rod coupled to the spoiler at a second location, the second location spaced apart from the first location, the rotary actuator operatively coupled to the first actuator rod via the first output shaft and to the second actuator rod via the second output shaft to cause the spoiler to move between one of a stowed position and a raised position or the stowed position and a drooped position.

2. The spoiler actuation system of claim 1, wherein the first end of the first output shaft is coupled to the first end of the rotary actuator via a universal joint.

3. The spoiler actuation system of claim 1, wherein the second end of the first output shaft is coupled to a first portion of the first crank arm and the first actuator rod is coupled to a second portion of the first crank arm, and wherein the rotation of the first crank arm causes the spoiler to move between the stowed position and the raised position or the stowed position and the drooped position.

4. The spoiler actuation system of claim 1, wherein the second end of the first output shaft is coupled to the first crank arm via a first spline.

5. The spoiler actuation system of claim 4, wherein the second crank arm is coupled to the second output shaft via a second spline, the first spline coaxial with the second spline.

6. The spoiler actuation system of claim 1, wherein the first actuator rod is coupled to a rib and the rib is coupled to the spoiler via a first fastener.

7. The spoiler actuation system of claim 6, wherein the spoiler is to rotate about the first fastener when the spoiler moves.

8. An aircraft including:
a spoiler;
a rotary actuator;
a first output shaft and a second output shaft coupled to the rotary actuator;
a first rib coupled to the spoiler;
a first actuator rod coupled to the spoiler and the first rib;
a second rib coupled to the spoiler;

a second actuator rod coupled to the spoiler and the second rib; and a third rib having a first end coupled to the rotary actuator, the rotary actuator and the third rib disposed between the first rib and the second rib, the rotary actuator disposed between the first end of the third rib and the spoiler, the first output shaft extending between the rotary actuator and the first rib, the second output shaft extending between rotary actuator and the second rib, the rotary actuator operatively coupled to the spoiler via the first actuator rod and the second actuator rod to cause the spoiler to move between one of a stowed position and a raised position or the stowed position and a drooped position.

9. The aircraft of claim 8, wherein the first rib includes a first opening defined therein and the second rib includes a second opening defined therein, the first opening aligned with the second opening.

10. The aircraft of claim 9, wherein the third rib includes a third opening defined therein, the third opening aligned with the first opening and the second opening.

11. The aircraft of claim 8, wherein the first rib is coupled to the spoiler via a first fastener and the second rib is coupled to the spoiler via a second fastener, the spoiler to pivot about an axis extending through the first fastener and the second fastener.

12. The aircraft of claim 8, further including:
a first crank arm coupled to the first rib, the first actuator rod coupled to the first crank arm; and
a second crank arm coupled to the second rib, the second actuator rod coupled to the second crank arm, the rotary actuator to cause the first crank arm and the second crank arm to rotate to cause the spoiler to move between the stowed position and the raised position or the stowed position and the drooped position.

13. The aircraft of claim 12, wherein the first output shaft is coupled to the first crank arm and the second output shaft is coupled to the second crank arm.

14. The aircraft of claim 13, wherein the first output shaft is coupled to the first crank arm via a spline.

15. A spoiler actuation system comprising:
a rotary actuator including a first shaft extending from a first end of the rotary actuator and a second shaft extending from a second end of the rotary actuator, the first end of the rotary actuator opposite the second end of the rotary actuator;
a first actuator rod coupled to a first portion of a spoiler;
a second actuator rod coupled to a second portion the spoiler, the first portion spaced apart from the second portion;
first means for displacing the first actuator rod; and
second means for displacing the second actuator rod, the first means for displacing and the second means for displacing operatively coupled to the rotary actuator, at least a portion of the first shaft and at least a portion of the second shaft to rotate about a first axis, the first means for displacing and the second means for displacing to rotate about a second axis, the second axis different than the first axis, displacement of the first actuator rod via the first means for displacing and displacement of the second actuator rod via the second means for displacing to cause the spoiler to move.

16. The spoiler actuator system of claim 15, wherein the first means for displacing includes a first arm coupled to the first shaft.

17. The spoiler actuator system of claim 16, wherein the second means for displacing includes a second arm coupled to the second shaft.

18. The spoiler actuator system of claim 16, wherein the first arm is coupled to the first shaft via a spline.

19. The spoiler actuation system of claim 15, wherein the first means for displacing and the second means for displacing are to cause the first portion of the spoiler to pivot and the second portion of the spoiler to pivot about a third axis.

20. The spoiler actuation system of claim 15, further including a first rib coupled to the spoiler and a second rib coupled to the spoiler, the first means for displacing coupled to the first rib and the second means for displacing coupled to the second rib.

* * * * *